Figure 2:
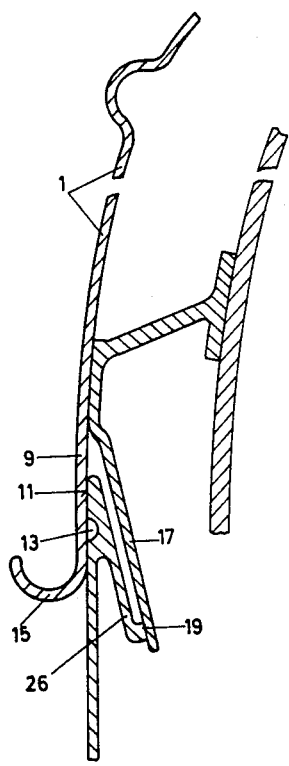

United States Patent [19]
Beschmann et al.

[11] 3,713,679
[45] Jan. 30, 1973

[54] JOINT OF LIGHT METAL PARTS

[76] Inventors: Horst Beschmann, Waldhofstr. 8, 9240 Uzwil; Ernst Wanner, zur Halde 556, 8222 Beringen, both of Switzerland

[22] Filed: March 17, 1971

[21] Appl. No.: 125,256

[52] U.S. Cl. ............... 287/189.36 D, 52/51, 52/262, 105/401, 105/409
[51] Int. Cl. ............................................. F16b 5/08
[58] Field of Search .287/189.36 D, 189.36 B; 52/45, 52/51, 262; 296/28 M; 105/401, 409

[56] References Cited

UNITED STATES PATENTS

| 2,175,605 | 10/1939 | Holub | 287/189.36 D |
|---|---|---|---|
| 1,934,330 | 11/1933 | Ruppelt | 287/189.36 D |
| 3,531,147 | 9/1970 | Johnson | 287/189.36 B |
| 3,166,163 | 1/1965 | Wahlfeld | 287/189.36 B X |
| 1,725,277 | 8/1929 | Johnson | 287/189.36 D |
| 3,399,916 | 9/1968 | Ensor | 287/189.36 D |
| 2,323,316 | 7/1943 | Dieter | 287/189.36 B |

*Primary Examiner*—David J. Williamowsky
*Assistant Examiner*—Wayne L. Shedd
*Attorney*—Browdy & Neimark

[57] ABSTRACT

A joint made of light metal parts particularly suited for rail vehicles for attaching a prefabricated roof and pre-fabricated side walls or the like in which the joint is formed as a plug connection between one part having a wedge-shaped profile and a complementary slotted profile in the other part.

6 Claims, 2 Drawing Figures

PATENTED JAN 30 1973

3,713,679

INVENTORS
Horst Beschmann
Ernst Wanner
BY
Broudy and Neimark
attorneys

JOINT OF LIGHT METAL PARTS

This invention relates to a joint of light metal parts, in particular for rail vehicles, for example between a pre-fabricated roof and pre-fabricated side walls, or a joint between the vehicle floor and side walls of a prefabricated rail vehicle box frame.

Considerable difficulties arise if such large parts of light metal are welded together by means of longitudinal seams in the same manner as is known for large parts of steel. These problems arise due to the considerable heat expansion and shrinkage, the high sensitivity relative to observing the welding temperature and finally due to the tension rupture corrosion occurring in the case of light metal. Furthermore, light metal cannot be treated by means of heat and hammering, as is the case with steel. The light metal cannot readily absorb without danger the pre-tensions caused thereby, in particular if subsequently considerable operational requirements and corrosive actions occur.

In view of the above-mentioned difficulties the present invention has as its purpose to perform an many of the required welding joints as possible by way of machine seam welding or spot welding. Manual welding, which cannot be performed simultaneously in such an economical reliable, uniform and neat fashion as can be done by way of machine welding, should be limited to welding required on assembly; where machine welding cannot be performed.

The present invention is characterized in this sense thereby that it is formed as a plug connection in which one part has a wedge shape profile which interlocks with a complementary slotted profile in the other part.

At least one of the two interlocking profile parts has an element which can be deformed elastically. The profiles may have inner parts which can be joined by means of an additional positive coupling, e.g. by means of welding or by rivetting. In case of welding, this can be interrupted in places. Also the inner profile parts can be interrupted in places.

For improving the sealing of the joint, as least one surface of the wedge-shaped reduction may constitute a sealing surface and can be provided with one or more grooves in juxtaposition with a surface of the complimentary slotted profile which interrupt the sealing surface in labyrinth fashion. Further additional sealing means, such as for example a rubber cord, obviously can also be used, but is not essential.

Figure 1:
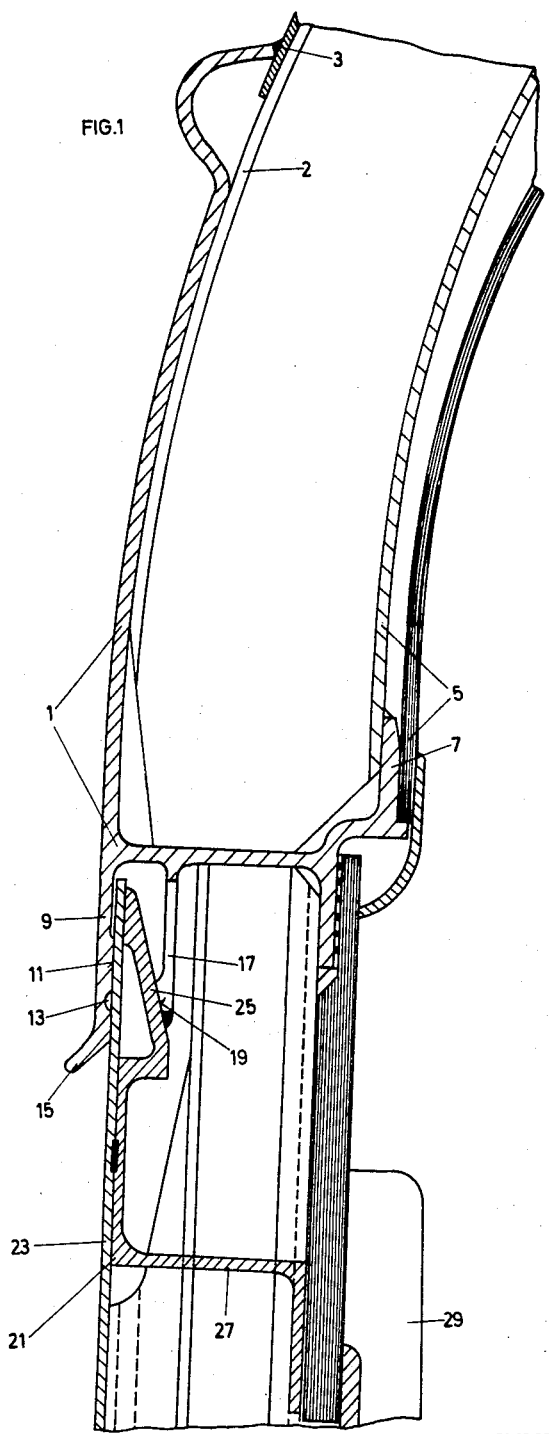

Two embodiments of the invented joint are explained hereinafter with reference to two figures in the accompanying drawings. These show, in section, parts of a joint between the roof and side wall of a train wagon, wherein FIG. 1 is a cross sectional view of the joint; and FIG. 2 is a similar view of a modified form of the invention.

The two embodiments consist essentially of the same parts, which are provided with similar reference numerals.

A lower roof frame profile 1 is rigidly joined to a roof sheet 2 in an apparatus by means of a continuous welding seam 3. The roof frame profile 1 is provided simultaneously with a flange 7 for fixing an inner roof lining 5. It forms a strengthening carrier for the prefabricated roof. In addition the roof frame profile 1 has at its underside an external extension 9 having a sealing layer 11 on its inside. This sealing layer 11 is provided with one or more grooves 13. The external extension 9 also has a drop channel 15, which can be formed simultaneously as a roof gutter. The roof frame profile also has an interior abutment rib 17 the lower part of which has an inclined surface 19.

A closing-off profile 21, on the outside wall, which is rigidly joined to an external wall sheet 23, for example by means of spot welding, is formed in its upper joint as a wedge-shaped profile part 25. The wedge-shape is such that it fits into the recess formed between the outer extension 9 and the abutment rib 17. The side wall closing-off profile 21 additionally has a flange 27, to which a wall inner lining 29 can be fixed.

The embodiment shown in FIG. 2 is similar in construction to FIG. 1. However, whereas in FIG. 1 the wedge-shaped profile part 25 is practically rigid, a yielding wedge rib 26 is provided according to the embodiment of FIG. 2, the rib 26 abutting with its surface 19 against the abutting rib 17. This embodiment is slightly more resilient than that of FIG. 1.

The new roof-side wall-joint allows for a simple assembly of the pre-fabricated roof with the prepared vehicle box frame or of the side wall and floor or corresponding large parts of vehicles. On putting up the roof, the dripping channel 15 and the inclined surface 19 form a funnel-like opening at the rib 17, into which the wedge-shaped profile part 25 of the side wall profile 21 can be inserted even where small dimensional variations occur.

The wedge-like interlocking of the two edge profile 1 and 21 overcomes small production inaccuracies, provides a mechanical fixing of the two large parts (light metal parts) without play, and at its outer part forms a sealing (sealing surface 11) and allows for an additional positive coupling between the two large parts, for example, by means of welding or rivetting of the inner parts. In doing this, the positive coupling may not be tight and also must not be finished off smoothly. This additional positive coupling may, for example, be an interrupted welding seam.

An important advantage is the elimination of an outer, uninterrupted, longitudinal and tight welding seam. The welding seam required for the described joint is on the inner side and need not be uninterrupted. This results in a minimum welding distortion and the requirement of a subsequent treatment of the welding seams falls away completely. The wedge-shaped interlocking profile parts can be provided to be continuous or to be interrupted on the inner side. The sealing is provided by metallic contact of the external profile parts 9, 11, whereby it is advantageous to provide one or more longitudinal grooves 13, in order to interrupt the capillary action. These can be provided with seals, e.g. rubber cord.

A type of labyrinth action results, which prevents the rise of water from outside into the wagon parts. Such joints are also applicable in constructions such as houses, railings, etc.

It will be obvious to those skilled in the art that various changes may be made without departing from the scope of the invention and the invention is not to be considered limited to what is showing in the drawings and described in the specification.

What is claimed is:

1. In a car body for rail vehicles comprising a prefabricated roof and a side wall connected thereto, both said roof and wall being of a metal lighter than steel, the improvement wherein means connecting said side wall to said roof comprises:

a plurality of wedge-shaped male elements on one of said side walls and roof, and a corresponding plurality of larger wedge-shaped female elements on the other of said side wall and roof, said male and female elements being interengaged, each said male element having an acute angle apex formed by first and second leg portions, each said first male leg portion lying in a plane parallel to the plane of said side wall, and each said female element having first and second leg portions, each said first female leg portion lying in a plane parallel to the plane of said side wall, said first male and female leg portions contacting one another along an area of the inner surface of said first female leg portion and an area of the outer surface of said first male leg portion, one of said first male and female leg portions having a groove therein along the said contacting surface, said groove extending parallel to said acute angle apex formed by said male element leg portions, one of said second male and female leg portions being inclined at said acute angle, and at least one of said second male and female leg portions being elastically deformable, at least one of said second male and female leg portions having means thereon to space said second male leg portion from said second female leg portion, said means comprising an offset portion having a surface inclined at said acute angle and contacting said one second male or female leg portion inclined at said acute angle, and an additional positive coupling between said roof and wall, said additional positive coupling being located along an inner element.

2. A construction according to claim 1 wherein said positive coupling is a continuous welding.

3. A construction according to claim 1 wherein said positive coupling is a discontinuous welding.

4. A construction in accordance with claim 1 wherein said second male leg portion is inclined at said acute angle and said offset portion inclined at said acute angle is carried by said second female leg portion and abuts against said second male leg portion.

5. A construction in accordance with claim 1 wherein both said second male and female leg portions are inclined at said acute angle and said offset portion is carried by said second male leg portion and abuts against said second female leg portion.

6. A construction according to claim 1, characterized in that a sealing member is located in said groove.

* * * * *